July 22, 1969  T. CHARLTON ET AL  3,457,442
CONNECTOR BLOCK FOR ANCHORING LEADS TO DYNAMOELECTRIC MACHINES
Filed Oct. 13, 1967  2 Sheets-Sheet 1

WITNESSES
Theodore F. Wrobel
E. Strickland

INVENTORS
Thomas Charlton and
Jack E. Crites
BY
ATTORNEY

United States Patent Office 3,457,442
Patented July 22, 1969

3,457,442
CONNECTOR BLOCK FOR ANCHORING LEADS TO DYNAMOELECTRIC MACHINES
Thomas Charlton, Lima, and Jack E. Crites, Bellefontaine, Ohio, assignors to Westinghouse Electric Corporation, Pittsburgh, Pa., a corporation of Pennsylvania
Filed Oct. 13, 1967, Ser. No. 675,144
Int. Cl. H02k 11/00
U.S. Cl. 310—71    6 Claims

ABSTRACT OF THE DISCLOSURE

An insulating connector block for firmly securing a connection between a magnet wire conductor of a stator winding and power lead conductor to the end turns of the winding. This is accomplished by a connector means electrically connecting the lead and magnet wire together, and at least one opening in the connector block having an inwardly projecting ridge adapted to engage and secure the connector after it is disposed within the opening; the insulating block is secured firmly to the end turns of the stator winding by two integral, barbed leg means spaced apart to straddle the end turns and engage the magnet wires of the end turns immediately adjacent an end of a stator core.

Background of the invention

The present invention relates generally to insulating mechanical connecting means for dynamoelectric machines, and particularly to an insulating connector structure anchored to the end turns of a stator winding.

Heretofore, in the manufacture of wound stators for induction motors, it has been the practice to connect the enameled or otherwise insulated wire conductor of the stator coil turns to a stranded lead cable (for supplying power to the motor) by either a mechanical connecting means or by welding the magnet wire (i.e. the insulated wire conductor) and stranded lead together. The connection was then insulated (with a sleeve of insulating material disposed around the connection, for example) and buried in the end turns of the winding or in one of the slots in the stator core with a substantial length of lead wire in order to firmly anchor the connection therein.

This anchoring method is costly since it requires time and labor to perform as well as the connection insulation and the addition, and essentially wasted, length of lead wire buried in the end turns or core slot.

In addition to the labor and material costs of the buried type connector, repeated tests and use have indicated that the connector is a constant source of trouble. In the process of shaping and compacting the end turns of the stator winding, the buried connection and its insulation undergoes considerable pressure which tends to weaken the insulation so that ultimately (with use of the stator in a machine) it becomes the weakest point in the overall insulation system of the machine. Further, the insulated sleeve can be easily displaced in the process of tucking the lead and connection in the end turns thereby increasing the chance of electrical shorts and machine failure.

Brief summary of the invention

The present invention proposes an economical yet effective means for firmly securing the connection of a power lead and magnet wire to the stator without the costly and troublesome means and method of burying the connection and its insulating material in the end turns of a stator winding. This is accomplished by the use of a molded insulating connector block adapted to be firmly anchored on the end turns of a stator winding, and having means for firmly securing the power lead-magnet wire connection in the connector block. The connector block is provided with integrally formed barbed legs which provide the firm anchor by being disposed around the end turns as they leave a slot in the stator core. Each connection is made by disposing an end of the power lead and magnet wire in a metal connector which has either an outside peripheral ridge or flange, or simply a sharp edge. The connector is disposed in a tubular portion formed in the block, and is retained therein by an inwardly extending ridge or projection provided on the inside surface of each tubular portion which engages the flange or edge of the connector to prevent it from being withdrawn. Substantial increases in savings and reliability result with the use of the above described structure since the labor and lead wire material for anchoring purposes is eliminated, and the connector insulation is provided by a reliable, sturdy connector block not subject to being displaced or to the compacting pressures of the end turns.

The drawings

The above, briefly described, connecting means provides economies and reliabilities in a manner that will be best understood by referring to the following detailed description in connection with the accompanying drawings, in which.

Preferred embodiment

Figure 1:
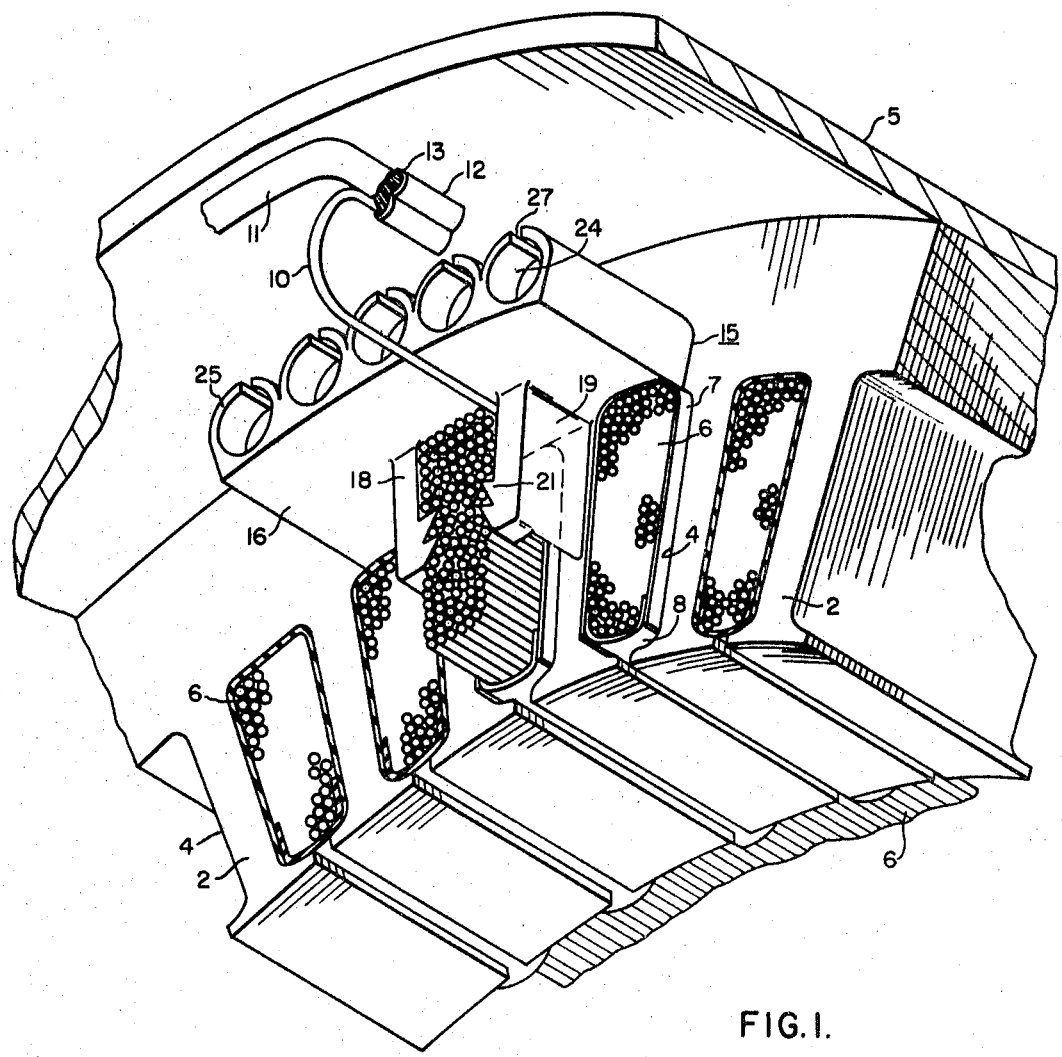
FIGURE 1 shows a perspective view of an insulating connector block disposed on the end turns of a stator winding and constructed in accordance with the principles of the invention.

Specifically, there is shown in FIG. 1, a partial perspective view of a wound stator for a rotating machine, such as a single phase induction motor. The stator includes a core 1 conventionally fabricated from a plurality of laminated magnetic sheets of material as shown. The core includes a plurality of angularly spaced apart teeth 2 which terminate to form a rotor receiving bore (only partially shown), and which form a plurality of winding accommodating slots 4 therebetween. The slots accommodate stator windings 6, as shown in FIG. 1, and the wound stator is enclosed in a housing or shell structure 5 only partially shown.

The windings 6 are formed by a number of turns of insulated enameled (magnet) wire, the winding being further insulated from the core 1 and the core teeth 2 within the slots 4 by insulating slot liners 7 and slot wedges 8. The liners and wedges generally extend beyond the ends of the core as shown in FIG. 1, though three of the liners and wedges shown in FIG. 1 are cut back (and shown in cross section) so as not to obscure other portions of the core and components depicted in the figure. Similarly, the windings 6 are shown cut-off for purposes of illustration though in actual practice they extend beyond the ends of the core to form loops or end turns (not shown) which are bent back near or against the ends of the core in a suitable space saving manner.

In order to supply power to the windings 6 a suitable connection is made between an end of the above mentioned enameled magnet wire and an insulated lead-in wire. In FIG. 1, the magnet wire is designated 10, and the lead or lead-in wire is designated 11.

In accordance with the principles of the inventions the magnet wire 10 and the lead wire 11 are electrically connected together by securing ends of the two wires in a metal connector 12 (by soldering or crimping, for two examples) having a sharp edge portion 13 as shown. The connector 12 is then inserted and secured in a novel insulating connector block 15, and thereby secured to the end turns of the winding 6, in a manner presently to be explained.

The connector block 15 of the present invention, and as shown in the figures, comprises preferably a molded member having a main body portion 16 laterally contoured to conform to the shape of the stator 1 and the housing or shell structure 5. The connector block is provided with two integrally formed legs 18 and 19 which extend in a substantially perpendicular direction from one surface of the main body portion 16. The legs are spaced apart by a distance corresponding to the width of one coil or winding 6 as it extends from a particular slot 4 in the stator core. In this manner the legs can be disposed to straddle the winding adjacent the slot and the end of the core as shown in FIG. 1.

Figure 3:
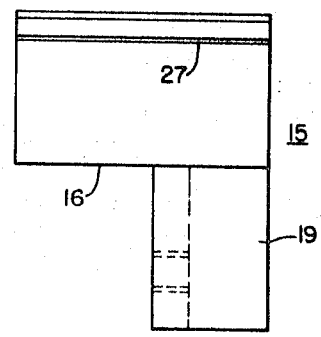
FIG. 3 is a right-hand side elevation view of the block shown in FIGS. 1 and 2.

The legs 18 and 19 are further provided with inwardly facing barb portions 21 which engage the wires of winding 6 thereby securing the block 15 to the winding as shown in FIG. 1. The width dimension of the leg 18 is preferably smaller than that of the leg 19 as best seen in comparing FIGS. 3 and 4. Such a structure is provided to improve the engagement of the barbs 21 with the end turns of the windings 6. The windings do not extend from and enter the stator slots 4 in a perpendicular manner as suggested by FIG. 1. of the drawings. Instead, the windings curve from and into the slots to form the end turns. The short barbs (on the narrow leg 18) are thus located to engage the inside of the curved extension of the windings 6, and the long barbs (on the wide leg 19) are located to engage the outside of the curved extension of the winding.

Figure 4:
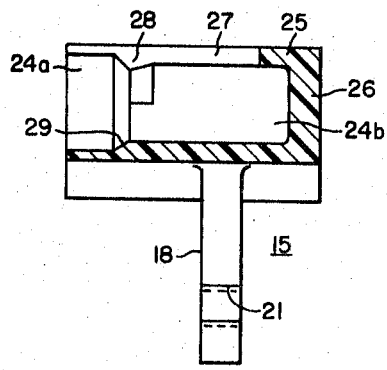
FIG. 4 is a cross sectional view of the block of FIG. 2 taken along line IV—IV.
Figure 5:
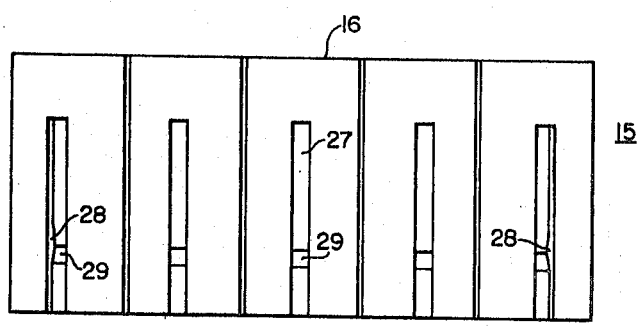
FIG. 5 is a top view of the block shown in FIG. 1 through 4.

The main body portion 16 of the connector block 15 is provided with a plurality of tubular shaped openings 24 which extend the substantial depth dimension of the main body portion thereby forming tubular shaped wall portions 25 and end wall portions 26 as best seen in FIG. 4. The width of the openings 24 conform generally to the width dimension of the metal connector 12 and its flange 13 in a manner to be more particularly described. In the approximate center of the upper half of each tubular wall portion 25 is provided an elongated slot 27 which extends a major portion of the length of the wall portion as best seen in FIGS. 4 and 5.

On the upper inside surface of each wall portion 25 is provided an inwardly projecting ridge 28 which extends part way (about half) around the inside of the opening 24. The ridge 28, as best seen in FIG. 4, has an essentially V or triangular shape configuration in elevation (or in cross section) with the pitch of the ridge angle facing the open, entrance portion of the opening 24 (designated 24a) being somewhat greater than the slope of the ridge angle facing inwardly towards an inward portion of the opening designated 24b.

Figure 2:
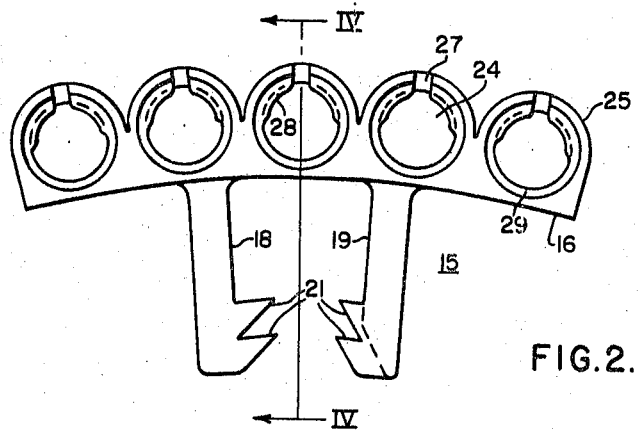
FIG. 2 is an end elevation view of the connector block of FIG. 1.

The ridge 28 is located longitudinally in the opening 24 with a transition portion 29 in the thickness of the wall structure 25 as best seen in FIG. 4. The wall structure forming the outward portion 24a of the opening is thinner than the wall structure forming the inner portion 24b of the opening. A front elevation view of the transition portion 29 and the ridge 28 for each opening 24 is shown in FIG. 2. The transition portion and the ridge thus essentially divide the tubular shaped opening 24 into the respective outer and inner portions 24a and 24b.

The above described connection between the magnet wire 10 and the lead wire or conductor 11 is firmly secured in the block 15 by inserting the metal connector 12 into one of the openings 24 provided in the block, and forcing the connector into the inner portion 24b of the opening 24 until the sharp edge portion 13 of the connector is past the ridge 28. The slot 27 provided in each of wall structures 25 facilitates insertion of the connector 12 by allowing the wall structure to expand with the insertion of the connector against the ridge 28. When the connector is fully disposed with the inner portion 24b of the opening 24, the wall structure 25 returns substantially to its original position, the material of the block 15 having preferably a resilient characteristic.

The connector 12 is thus firmly secured with the block 15 by its edge portion 13 engaging the inner ridge 28 on the inside of the opening 24.

The slots 27 serve further to allow the tubular wall structure 25 to expand when the pins of a forming mold structure are removed past the ridge 28 at the completion of a molding process during manufacture of the block 15. The slots 27 also enhance varnish treating processes in that they allow the varnish to more readily enter to the openings 24 to effect a good varnish coat on the inside thereof while simultaneously preventing the varnish from remaining and collecting in the openings, thereby saving that amount of varnish.

The insulating connector block 15 and the securing of the magnet-lead wire connection in the block as explained above effect further savings in labor and material. For example, an extended length of the lead wire 11 tucked into the end turns of the stator winding is not required thereby saving the lead wire material and the time and labor required for such securing operation.

A further advantage of the invention is the improved reliability of the insulation around the magnet-lead wire connection. The connector block 15 is a rugged structure that is not easily displaced or worn as is the case with an insulating sleeve disposed around the connection and tucked into the end turns. Further, the firm anchor provided by the connector block prevents work hardening and damage to the magnet wire caused by machine vibration since the wire is subject to little or no movement or flexing. Also, the accessibility of the connector block results in improved maintenance and repair techniques.

All of the advantages associated with the novel insulating connector block 15 are accomplished with a minimum cost, the block 15 being a simple and inexpensive piece to fabricate.

The invention has been described, in connection with a preferred embodiment. It should be understood, however, that the invention is not limited to the particular embodiment described, but covers all alternative and equivalent constructions falling within the scope of the appended claims.

What is claimed is:

1. In a dynamoelectric machine having a stator core supporting insulated conductors forming a stator winding having end turns,
   an insulating support means for supporting and anchoring a connection between the insulated wire conductor of the stator winding and a lead-in conductor, said support means comprising
   an insulating block of material having a main body portion,
   integrally formed tubular openings provided in said main body portion,
   elongated, integrally formed leg structures projecting from one surface of said main body portion,
   the tubular openings having means for securing the lead-in to winding conductor connection therein, and
   the leg structures being adapted to straddle the end turns of the stator winding,
   the leg structures having means for engaging the wire conductors forming the end turns.

2. The support means of claim 1 in which the tubular openings are provided with a longitudinally extending slot and an inwardly projecting ridge portion.

3. The support means of claim 2 in which said connection includes a metal connector gripping an end of the lead-in conductor and an end of the stator winding conductor together,
the metal connector having a sharp edge portion for engaging the inwardly projecting ridge portion of the tubular openings.

4. The support means of claim 1 in which the means on the leg structures for engaging the wire conductor are integrally formed barbed surfaces.

5. The support means of claim 1 in which the main body portion of the connector block is curved to conform to the shape of the stator core.

6. The support means of claim 1 in which the leg structures have different width dimensions.

References Cited

UNITED STATES PATENTS

| | | | |
|---|---|---|---|
| 905,868 | 6/1905 | Griffith | 310—260 |
| 1,064,295 | 1/1907 | Dawson | 310—260 |
| 1,331,970 | 2/1920 | Williamson | 310—260 |
| 1,512,693 | 10/1924 | Juillard | 310—260 |

WARREN E. RAY, Primary Examiner

R. SKUDY, Assistant Examiner

U.S. Cl. X.R.

310—260